United States Patent
Scott

(10) Patent No.: US 8,402,384 B2
(45) Date of Patent: Mar. 19, 2013

(54) DYNAMIC BAR ORIENTED USER INTERFACE

(75) Inventor: Sherryl Lee Lorraine Scott, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 1849 days.

(21) Appl. No.: 10/983,606

(22) Filed: Nov. 9, 2004

(65) Prior Publication Data

US 2006/0101350 A1    May 11, 2006

(51) Int. Cl.
*G06F 3/048* (2006.01)

(52) U.S. Cl. .................... 715/779; 715/808; 715/864

(58) Field of Classification Search .............. 715/779, 715/808, 854, 864; 455/566, 564, 556, 557
See application file for complete search history.

(56) References Cited

U.S. PATENT DOCUMENTS

| | | | |
|---|---|---|---|
| 5,617,526 A | 4/1997 | Oran et al. | |
| 6,047,197 A * | 4/2000 | Jarrad ............................ | 455/566 |
| 6,172,677 B1 * | 1/2001 | Stautner et al. ................ | 715/716 |
| 6,211,858 B1 * | 4/2001 | Moon et al. .................... | 715/771 |
| 6,486,914 B1 * | 11/2002 | Anderson .................. | 348/333.02 |
| 6,522,347 B1 * | 2/2003 | Tsuji et al. ..................... | 715/848 |
| 6,597,378 B1 * | 7/2003 | Shiraishi et al. ............... | 715/764 |
| 6,868,283 B1 * | 3/2005 | Bonansea et al. .............. | 455/566 |
| 7,221,331 B2 * | 5/2007 | Bear et al. ....................... | 345/1.1 |
| 7,353,466 B2 * | 4/2008 | Crane et al. .................... | 715/752 |
| 2001/0028365 A1 * | 10/2001 | Ludolph ....................... | 345/764 |
| 2001/0029527 A1 * | 10/2001 | Goshen .......................... | 709/218 |
| 2001/0035881 A1 * | 11/2001 | Stoakley et al. ............. | 345/772 |
| 2002/0126146 A1 * | 9/2002 | Burns et al. .................... | 345/752 |
| 2003/0013483 A1 * | 1/2003 | Ausems et al. ................ | 455/556 |
| 2003/0120957 A1 | 6/2003 | Pathiyal | |
| 2003/0142125 A1 | 7/2003 | Salmimaa et al. | |
| 2003/0160815 A1 * | 8/2003 | Muschetto ...................... | 345/733 |
| 2003/0169294 A1 * | 9/2003 | Vatula et al. .................. | 345/764 |
| 2004/0155908 A1 * | 8/2004 | Wagner .......................... | 345/854 |
| 2004/0155909 A1 * | 8/2004 | Wagner .......................... | 345/854 |
| 2004/0204133 A1 * | 10/2004 | Andrew et al. ................ | 455/566 |
| 2004/0259598 A1 * | 12/2004 | Wagner et al. ................ | 455/566 |
| 2005/0020316 A1 * | 1/2005 | Mahini .......................... | 455/566 |
| 2005/0117733 A1 * | 6/2005 | Widger et al. ............ | 379/221.05 |

(Continued)

FOREIGN PATENT DOCUMENTS

EP    1152333 A2    7/2001
EP    1265157 A2    11/2002

(Continued)

OTHER PUBLICATIONS

Apple Press, Newton 2.0 User Interface Guidelines, May 1996, Addison-Wesley, pp. 1-307.*

(Continued)

*Primary Examiner* — Phenuel Salomon
(74) *Attorney, Agent, or Firm* — Norton Rose Canada LLP

(57) ABSTRACT

Method and user interface for controlling an apparatus are provided. At least one dynamic bar is provided for displaying on a main screen of a graphical user interface for controlling the apparatus. Each dynamic bar is associated with respective one or more interfaces for applications and/or functions provided by the apparatus and each dynamic bar has a pop-up interface for providing at least one of preview information determined from information managed by the applications and/or functions and links to invoke said respective interfaces.

13 Claims, 11 Drawing Sheets

U.S. PATENT DOCUMENTS

| | | | | |
|---|---|---|---|---|
| 2005/0188320 A1* | 8/2005 | Bocking | | 715/752 |
| 2005/0213717 A1* | 9/2005 | O'Neil et al. | | 379/88.11 |
| 2006/0020904 A1* | 1/2006 | Aaltonen et al. | | 715/850 |
| 2006/0156256 A1* | 7/2006 | Lee | | 715/857 |
| 2010/0042951 A1* | 2/2010 | Ogren | | 715/841 |

FOREIGN PATENT DOCUMENTS

| | | |
|---|---|---|
| EP | 1 434 411 A1 * | 6/2004 |
| EP | 1434411 A1 | 6/2004 |
| WO | WO 03/100591 A | 12/2003 |
| WO | WO 03/100591 A2 * | 12/2003 |

OTHER PUBLICATIONS

European Search and Examination Report for European Patent Application No. 06125884.4, mailed Jun. 26, 2007.

Ipulse, Response to Search and Examination Report, filed in respect of European Patent Application No. 06125884.4, dated Sep. 5, 2007.

European Patent Office, Examination Report, issued in respect of European Patent Application No. 06125884.4, dated Jun. 19, 2008.

Ipulse, Response to Examination Report, filed in respect of European Patent Application No. 06125884.4, dated Dec. 19, 2008.

European Patent Office, Examination Report, issued in respect of European Patent Application No. 06125884.4, dated Jan. 16, 2009.

Ipulse, Response to Examination Report, filed in respect of European Patent Application No. 06125884.4, dated Jun. 1, 2009.

European Patent Office, Summons to Attend Oral Proceedings, issued in respect of European Patent Application No. 06125884.4, dated Sep. 29, 2010.

Barker Brettell, Response to Summons to Attend Oral Proceedings, filed in respect of European Patent Application No. 06125884.4, dated Dec. 22, 2010.

European Patent Office, Decision to Refuse a Patent Application, issued in respect of European Patent Application No. 06125884.4, dated Apr. 13, 2011.

Barker Brettell, Response to Notice of Appeal, filed in respect of European Patent Application No. 06125884.4, dated Aug. 23, 2011.

* cited by examiner

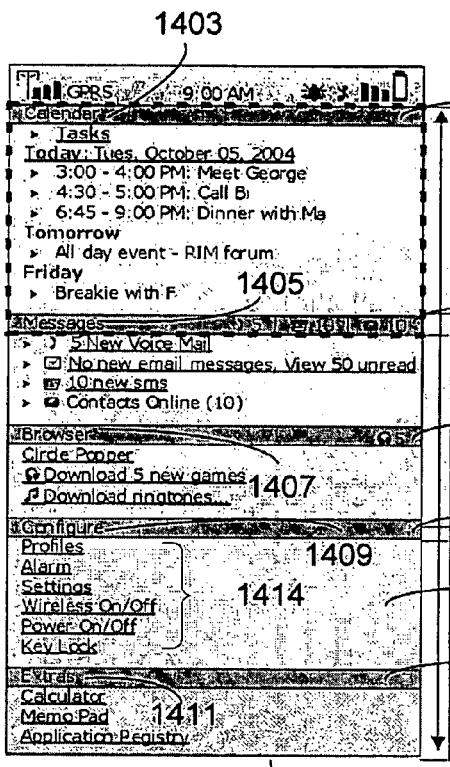
FIG. 14
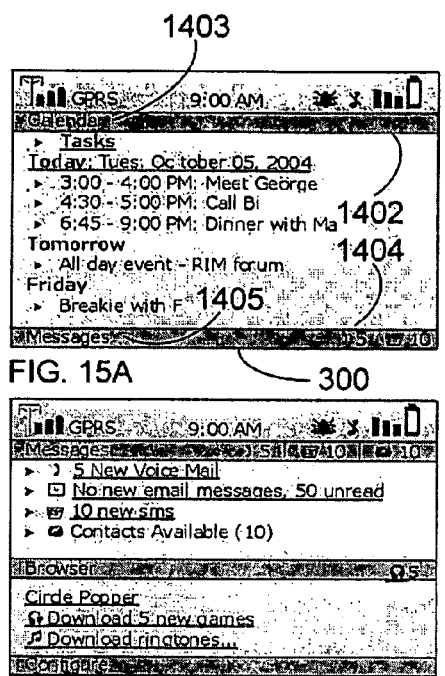
FIG. 15A
FIG. 15B
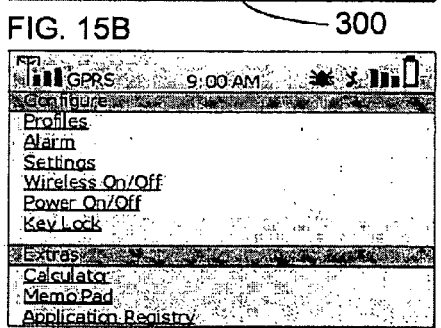
FIG. 15C

DYNAMIC BAR ORIENTED USER INTERFACE

FIELD OF THE INVENTION

The present invention relates generally to communication devices, and more particularly to a graphical user interface for controlling such devices.

DESCRIPTION OF THE RELATED ART

With the proliferation of communications services available on wireless mobile devices, it becomes increasingly complex to create a single device that can excel at many different functions. Many critics claim that a wireless telephone device can never make a good handheld personal digital assistant (PDA) device and a handheld PDA device will never make a good wireless telephone. It is also said that only teenagers are using Instant Messaging (IM) services or Short Message Services (SMS) to exchange messages with friends and acquaintances and that such users should get an entirely different wireless mobile device. However, many users of wireless handheld devices desire to have multiple services and functionality on a single device.

Representing multiple services and functions to a user on a single wireless mobile device presents a number of challenges to the designer of a user interface, particularly a graphical user interface (GUI), for controlling the device. Wireless devices are usually small relative to less portable computing devices such as laptops and desktop computers. Inherently then, a visual display such as an LCD or other screen component of the wireless mobile device has a small display area.

Typically, GUIs for wireless mobile devices comprise a main or home screen and one or more sub-screens that may be navigated from the main screen. Notification icons are often, rendered on a portion of the main screen to indicate a new event such as the receipt of a new IM message, electronic mail (e-mail) or other service events such as a calendar reminder or alarm and other status information such as time, date and battery life. For each type of service or function available via the device, a graphical image or icon is often rendered on a major portion of the main screen, which icon may be selected by moving a focus or cursor about the interface and selecting the desired item to launch a specific GUI for the selected service or function.

There is a demand to have information made available to a user quicker than previously available in order to optimize the control of the wireless device. An application icon or information or text (e.g. name or title) describing the application is generally static and as such is not particularly useful for representing changing information associated with the application activated by the icon. Representing current information to a user via a predominantly iconic GUI is difficult. Further, organizing such information in a useful manner to permit a user to better control the device is also problematic.

Accordingly, there is a resulting need for a method and apparatus that addresses one or more of these shortcomings.

SUMMARY

The invention relates to a method, graphical user interface and apparatus for controlling an apparatus.

In accordance with a first aspect of the invention, there is provided a method for controlling an apparatus comprising: providing at least one dynamic bar for displaying on a main screen of a graphical user interface for controlling the apparatus, each dynamic bar associated with respective one or more interfaces for applications and/or functions provided by the apparatus, said each dynamic bar having an pop-up interface for providing at least one of preview information determined from information managed by the applications and/or functions and links to invoke said respective interfaces; and invoking said respective interfaces to control said apparatus in response to user input.

In accordance with a second aspect of the invention, there is provided an apparatus comprising: a storage medium having stored therein a plurality of programming instructions designed to enable the apparatus to: provide at least one dynamic bar for displaying on a main screen of a graphical user interface for controlling the apparatus, each dynamic bar associated with respective one or more interfaces for applications and/or functions provided by the apparatus, said each dynamic bar having an pop-up interface for providing at least one of preview information determined from information managed by the applications and/or functions and links to invoke said respective interfaces; and invoke said respective interfaces to control said apparatus in response to user input; and a processor coupled to the storage medium to execute the programming instructions.

These and other aspects will be apparent to persons of ordinary skill in the art including a computer program product such as a machine readable medium storing computer program code executable to perform a method aspect of the invention.

BRIEF DESCRIPTION OF THE DRAWINGS

Embodiments of present invention will now be described by way of example with reference to attached figures, wherein:

FIG. 14 is an illustration of an example of a main screen, in accordance with another embodiment of the invention, for a wireless communication device such as the devices of FIGS. 1 and 2;

FIGS. 15A to 15C are illustrations of particular views of the main screen of FIG. 14 in accordance with an embodiment of the invention;

DETAILED DESCRIPTION

Figure 1:
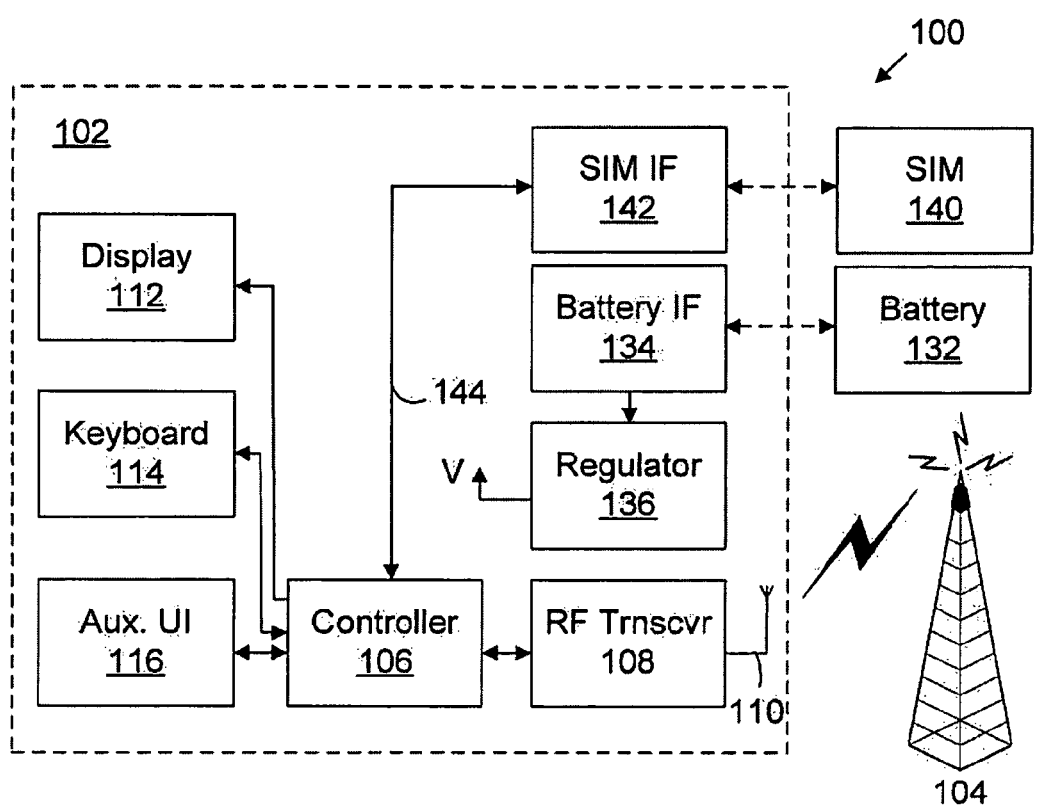
FIG. 1 is a block diagram which illustrates pertinent components of a wireless communication device which communicates within a wireless communication network in accordance with the prior art.

FIG. 1 is a block diagram of a communication system 100 which includes a mobile station 102 which communicates through a wireless communication network 104 symbolized by a station. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces witch device display 112 to display received information, stored information, user inputs, and the like Keyboard 114, which may be a telephone type keypad, full alphanumeric keyboard or full or condensed QWERTY keypad, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from the wireless network 104 over a wireless link via antenna 110. RF transceiver circuitry 108 performs functions similar to those of a base station and a base station controller (BSC) (not shown), including for example modulation/demodulation and possibly encoding/decoding and encryption/decryption. It is also contemplated that RF transceiver circuitry 108 may perform certain functions in addition to those performed by a BSC. It will be apparent to those skilled in art that RF transceiver circuitry 108 will be adapted to particular wireless network or networks in which mobile station 102 is intended to operate.

Mobile station 102 includes a battery interface (IF) 134 for receiving one or more rechargeable batteries 132. Battery 132 provides electrical power to electrical circuitry in mobile station 102, and battery IF 132 provides for a mechanical and electrical connection for battery 132. Battery IF 132 is coupled to a regulator 136 which regulates power to the device. When mobile station 102 is fully operational, an RF transmitter of RF transceiver circuitry 108 is turned on only when it is sending to network, and is otherwise turned off or placed in a low-power mode to conserve power. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface (IF) 142. SIM 140 is one type of a conventional "smart card" used to identify an end user (or subscriber) of mobile station 102 and to personalize the device, among other things. Without SIM 140, the mobile station terminal is not fully operational for communication through the wireless network. By inserting SIM 140 into mobile station 102, an end user can have access to any and all of his/her subscribed services. SIM 140 generally includes a processor and memory for storing information. Since SIM 140 is coupled to SIM IF 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including date book (or calendar) information and recent call information.

Mobile station 102 may consist of a single unit, such as a data communication device, a multiple-function communication device with data and voice communication capabilities a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Figure 2:
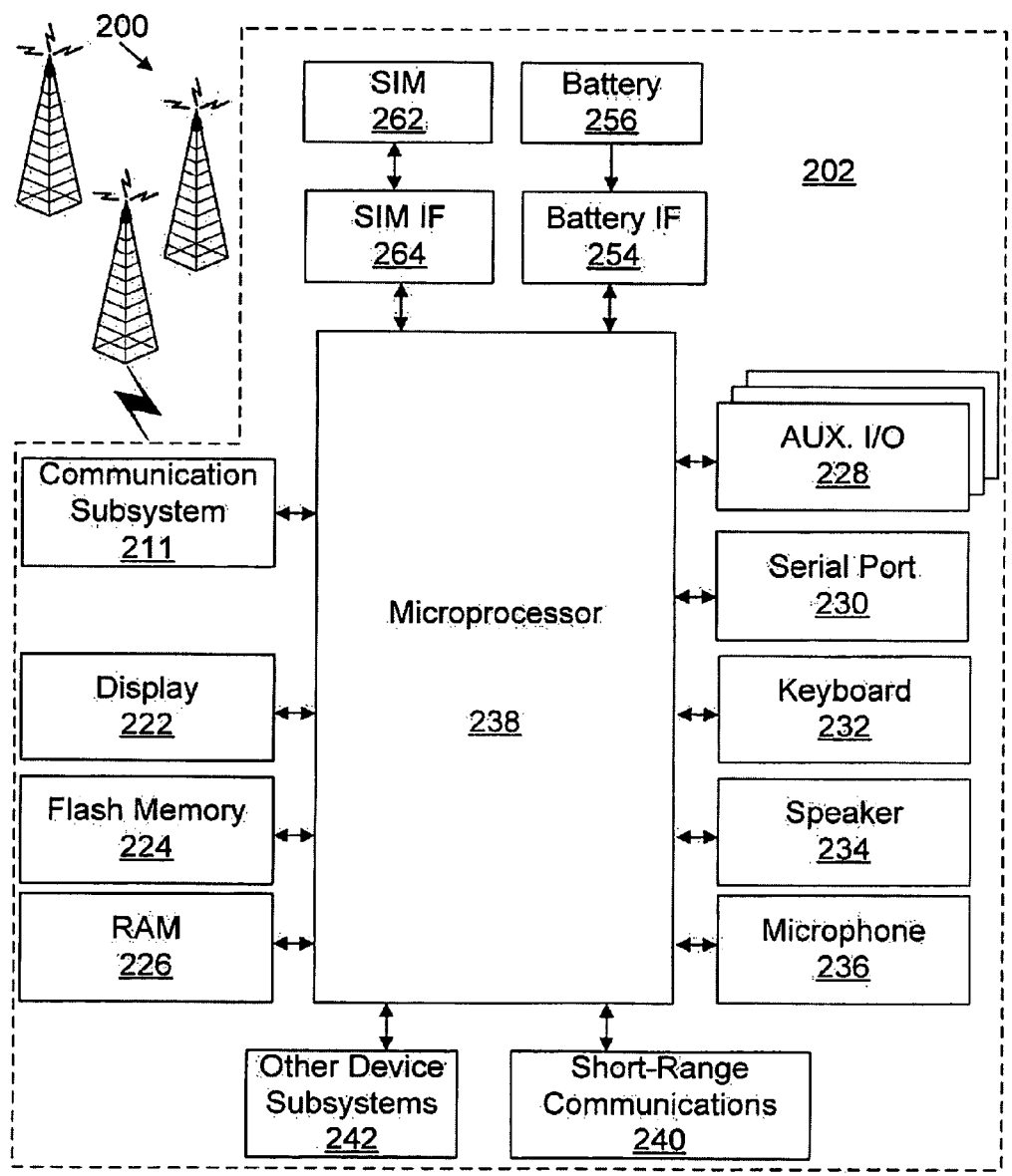
FIG. 2 is a more detailed diagram of a preferred wireless communication device of FIG. 1 in accordance with the prior art.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver, a transmitter, and associated components, such as one or more (preferably embedded or internal) antenna elements and, local oscillators (LOs), and a processing module such as a digital signal processor (DSP) (all not shown). Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Network access is associated with a subscriber or user of mobile station 202 and therefore mobile station 202 requires a Subscriber Identity Module or "SIM" card 262 to be inserted in a SIM IF 264 in order to operate in the network. SIM 262 includes those features described in relation to FIG.

1. Mobile station 202 is a battery-powered device so it also includes a battery IF 254 for receiving one or more rechargeable batteries 256. Such a battery 256 provides electrical power to most if not all electrical circuitry in mobile station 202, and battery IF 254 provides for a mechanical and electrical connection for it. The battery IF 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice) communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network 200, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222, to auxiliary I/O device 228 or both as described further herein below with reference to FIGS. 3-9. A user of mobile station 202 may also compose data items, such as e-mail messages, for examples, using keyboard 232 in conjunction with display 222 and possibly auxiliary I/O device 228. Keyboard 232 is preferably a telephone type keypad, full alphanumeric keyboard or full or condensed QWERTY keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile station 202 is configured for sending and receiving data items and includes a PIM for organizing and managing data items relating to the user such as, but not limited to, instant messaging (IM), e-mail, calendar events, calendar appointments, and task items, etc. By way of example, mobile station 202 is configured for voice (which may include push to talk over cellular (POC)) and data services, voice mail service, e-mail service, SMS and chat services to which the user subscribes. To provide a user-friendly environment to control the operation of mobile station 202, PIM together with the operation system and various software applications resident on the station 202 provides a GUI having a main screen from which to access various services via applications stored on said device or available to it.

Referring now to FIG. 13, there is an illustration of an exemplary main screen 300, in accordance with an embodiment of the invention, for display 222 of mobile station 202 providing a graphical user interface for controlling mobile station 202. Main screen 300 is divided into three main portions, namely an application portion 302 for displaying and manipulating icons (e.g. 312) for various software applications and functions enabled by mobile station 202 and a mobile station status portion 306 for displaying status, information such as time, date, battery and signal strength, etc. Main screen 300 may not represent all application icons at once in application portion 302. A user may be required to navigate or scroll through the icons of application portion 302 to view additional application icons.

Figure 3:
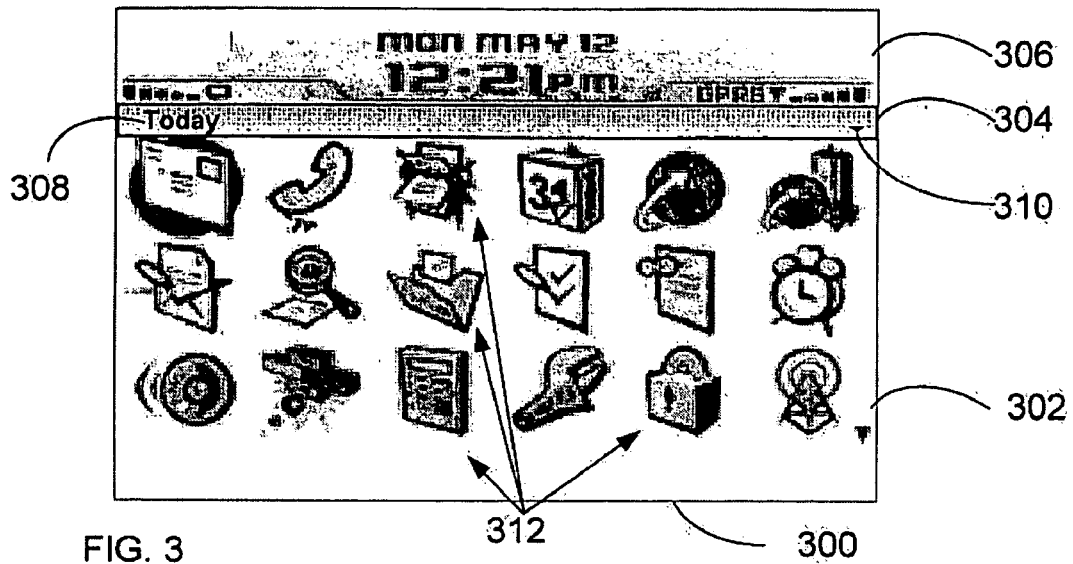
FIG. 3 is an illustration of an example of a main screen of a graphical user interface, in accordance with an embodiment of the invention, for a wireless communication device such as the devices of FIGS. 1 and 2.

In accordance with a first embodiment of the invention, FIG. 3 includes a third portion 304 comprising a dynamic bar for controlling device 202. Dynamic bar 304 stretches horizontally across the main screen between portions 302 and 306. Persons skilled in the art will appreciate that such portions may be arranged differently about screen 300. For example, dynamic bar 304 may lie horizontally across the bottom of screen 300 or vertically. Dynamic bar 304 need not extend fully from one margin of the screen to another.

Figure 4:
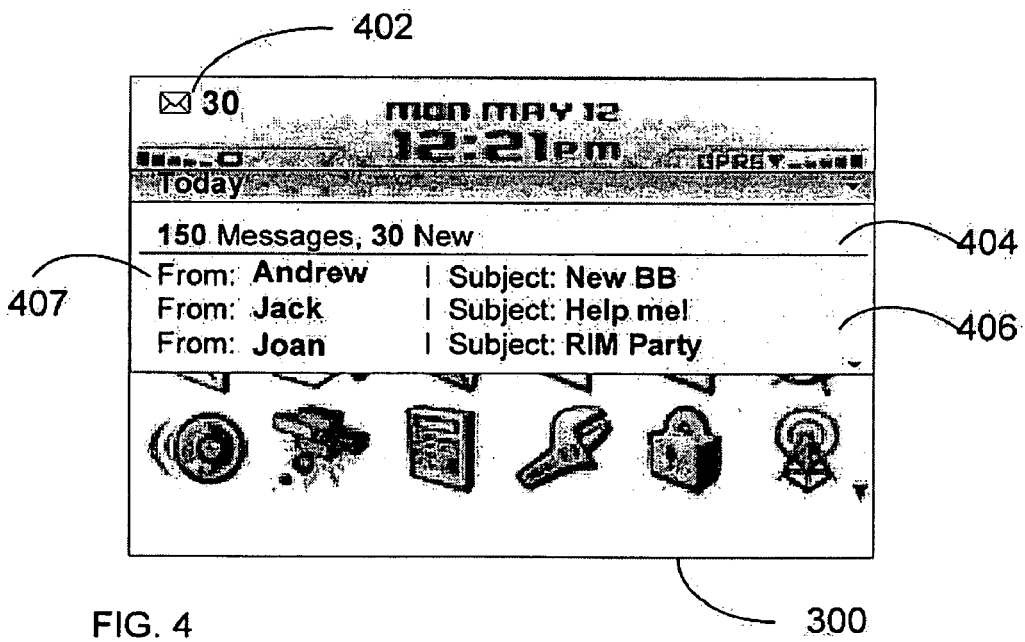
FIG. 4 is an illustration of the main screen of FIG. 3 following a user action.

Dynamic Bar 304 includes a label portion 308 which in the present embodiment comprises a date reference and an expansion icon (downward pointing arrowhead) 310. A user may click on the dynamic bar (e.g. using a point device, such as a thumb wheel) and expand the dynamic bar to preview items associated with the bar 304. In the present embodiment, dynamic bar 304 is associated with an email application to preview email messages. FIG. 4, in accordance with an embodiment of the invention, illustrates FIG. 3 following a user action to expand the dynamic bar 304. In FIG. 4, mobile station status portion 306 includes a new email count 402 indicating 30 unread emails. Dynamic bar 304 is expanded via a drop down or pop-up interface 407 overlaying a portion of screen 300. Therein, there is displayed a count of available and unread messages 404 and a preview of recent new emails 406 preferably filtered relative to the date shown in the label portion 308 of the dynamic bar as described further below. Optionally, a user may scroll through the list of recent emails. Clicking on the list will automatically invoke the email application, preferably at a view showing the selected email. Cancelling (e.g. via an escape or other key or click) closes the expansion pop-up 407.

Figure 5:
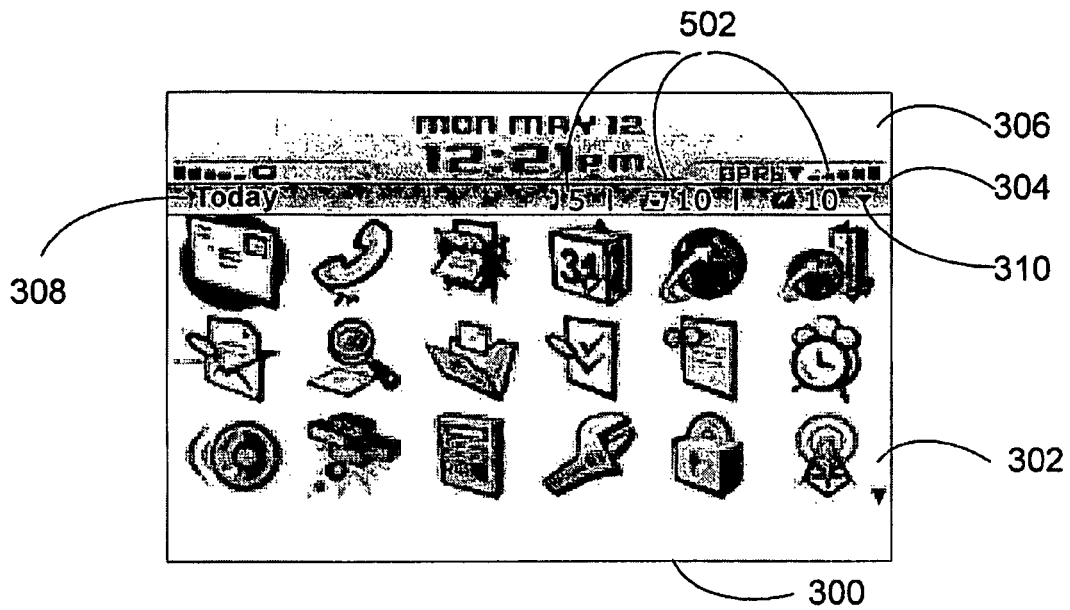
FIG. 5 is an illustration of an example of a main screen of a graphical user interface, in accordance with a further embodiment of the invention.
Figure 6:
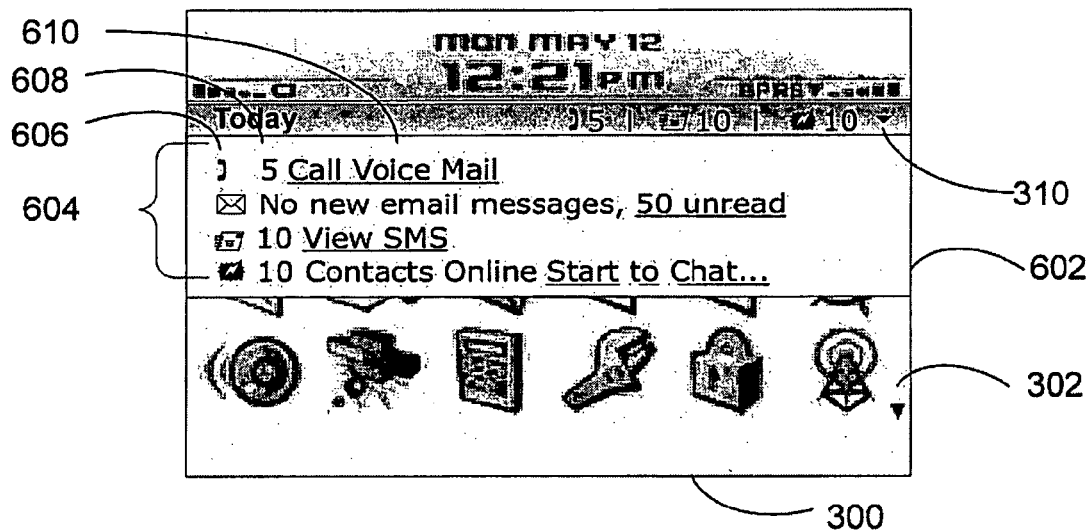
FIG. 6 is an illustration of the main screen of FIG. 5 following a user action.

FIGS. 5 and 6 illustrate similar main screens 300 as shown in FIGS. 3 and 4 but with a dynamic bar and expansion pop-up interface in accordance with a further embodiment of the invention. Dynamic bar 304 of FIGS. 5 and 6 includes counts of new events 502 (e.g. new voice mail messages, email messages, SMS messages or contacts online with which to chat). As such, mobile stations status portion 306 need not display such dynamic preview information. Other events types may be counted and displayed such as available friends or groups for Push-to-Talk over Celluar (POC) calls etc. The dynamic preview information need not be limited to a count. For example, the information may include some details of a recent event, which may be displayed temporarily for example. One such example is information about a missed call (e.g. "Missed call from NNN . . . ") which may be temporarily displayed. Thereafter, count or other preview information may be displayed.

Expansion pop-up 602 in the present embodiment does not preview a content of the new event but lists particular services 604 associated with the dynamic bar 304 such as voice mail, email, SMS and chat including an iconic representation of the service 606 and preview information comprising a count 608 as similarly displayed by bar 304 and a link 610 to invoke the associated application user interface for the service. Preview information may thus comprise information maintained by the associated applications and/or functions as well as information determined from this managed informations.

Figure 7:
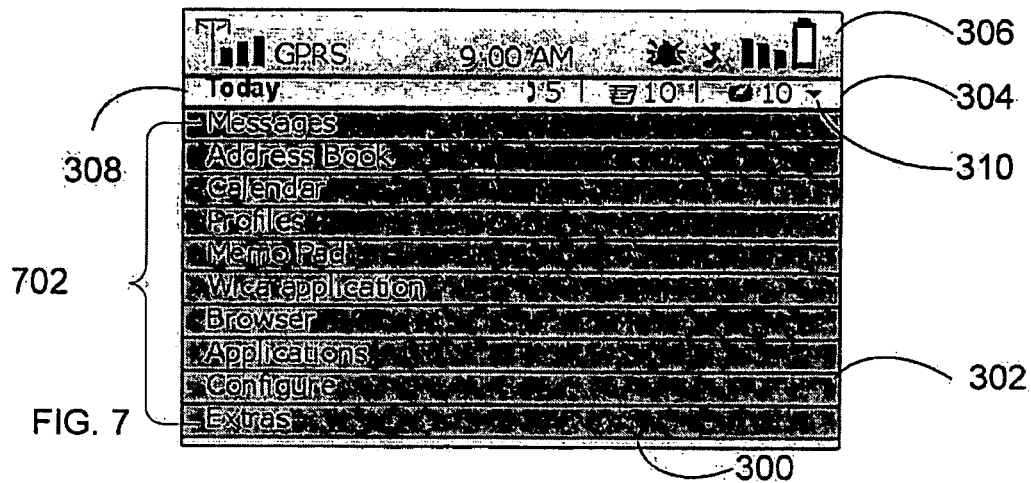
FIG. 7 is an illustration of an example of a main screen, in accordance with another embodiment of the invention, for a wireless communication device such as the devices of FIGS. 1 and 2.
Figure 8:
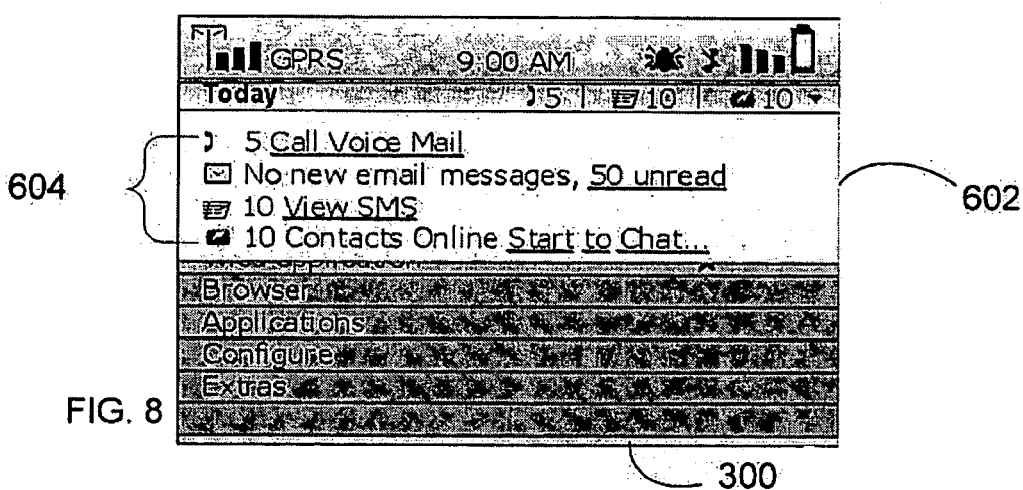
FIGS. 8 and 9 are illustrations of the main screen of FIG. 7 following respective user actions.
Figure 9:
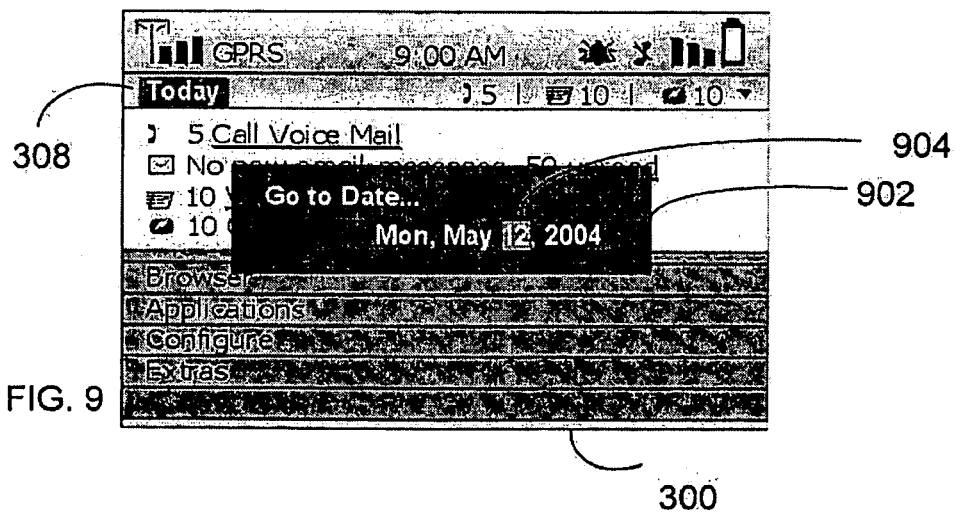

FIGS. 7 and 8 illustrate a similar dynamic bar and expansion pop-up 602 as shown in FIGS. 5 and 6 but with a difference, appearance to application portion 302. Rather than presenting icons for invoking respective interfaces to various applications or functions application portion 302 presents a list of bars 702 which may be navigated and selected to invoke an associated interface. Mobile station status portion 306 also has an alternative look from that shown in FIGS. 3-6. FIG. 9 illustrates a search or filter function having a dialog screen 902 which may be invoked from dynamic bar 304. Label portion 308 may be clicked for editing to select a different date 904. This date is then used to filter the associated events such that some or all of the counts 502 and 608 may be determined relative to the new date. For example, a count of friends on-line available to chat is not particularly relevant except in relation to the current date/time. In the embodiment of the dynamic bar and expansion pop-up of FIG. 4, such a date may filter the new messages for previewing, for example. As seen below and with reference to FIGS. 10 and 11B, a dynamic bar may be associated with other services or applications including a calendar application and the date may be useful for searching or filter calendar events and entries or a particular view.

Figure 10:
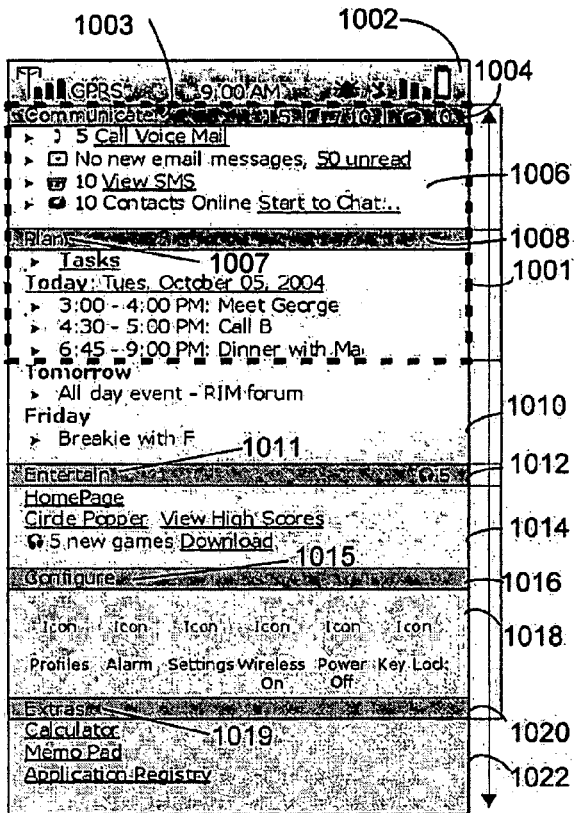
FIG. 10 is an illustration of an example of a main screen, in accordance with another embodiment of the invention, for a wireless communication device such as the devices of FIGS. 1 and 2.

FIGS. 10 and 11A to 11D illustrate yet a further embodiment of a main screen user interface of the present invention. FIG. 10 illustrates a user interface main screen 300 comprising a plurality of dynamic bars 1004, 1008, 1012, 1016 and 1020 each with respective label portions 1002, 1007, 1011, 1015 and 1019 and expansion pop-ups 1006, 1010, 1014, 1018 and 1022. When expanded the bars and pop-ups of main screen 300 of FIG. 10 are distinguished from the bar and pop-up of main screen 300 of earlier figures in that they cannot all be displayed on the display device at one time below mobile station status portion 1002. The remaining portion of display device 222 is denoted by box 1001. As such a user may navigate the main screen, scrolling up or down as necessary to display the desired dynamic bar and expansion screen of interest. FIGS. 11A to 11D illustrate respective views of main screen 300 of FIG. 10 visible within the dimensions of display device 222. A user may navigate from bar to bar such as by using a thumb wheel to position the desired bar at the top of portion 302.

Figure 11A:
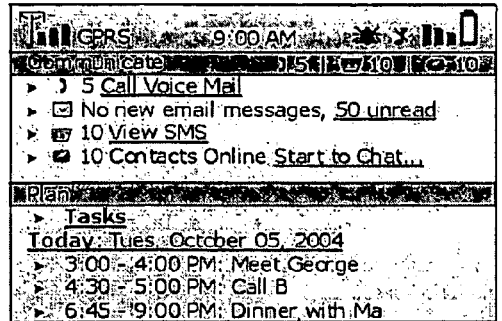
FIGS. 11A to 11D are illustrations of particular views of the main screen of FIG. 10.
Figure 11B:
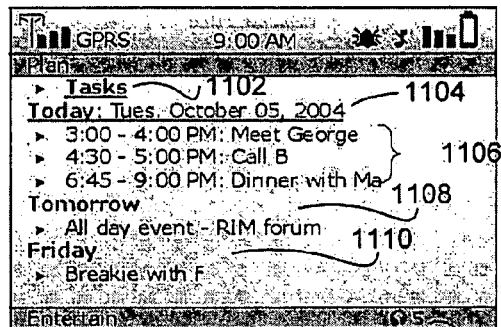
Figure 11C:
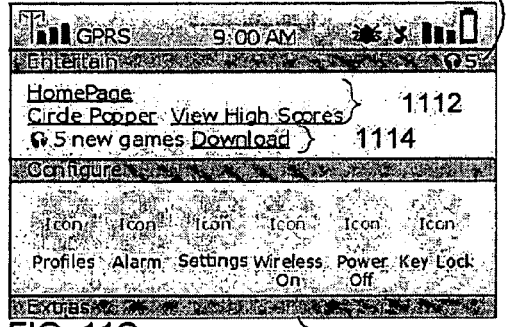
Figure 11D:
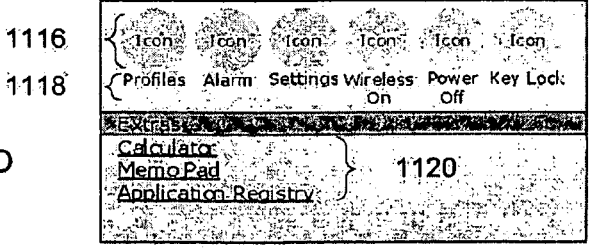
Figure 12A:
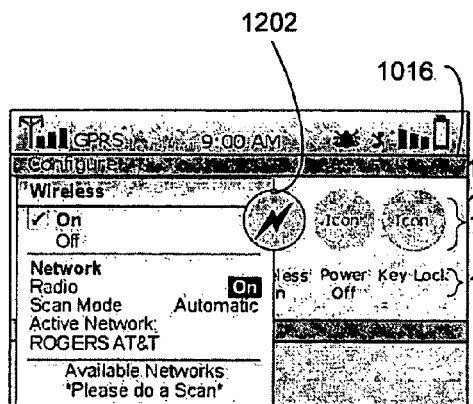
FIGS. 12A to 12D are detailed illustrations of the screen of F11D in accordance with an embodiment of the invention.
Figure 12B:
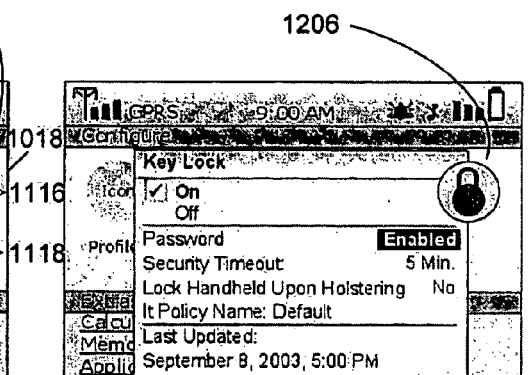
Figure 12C:
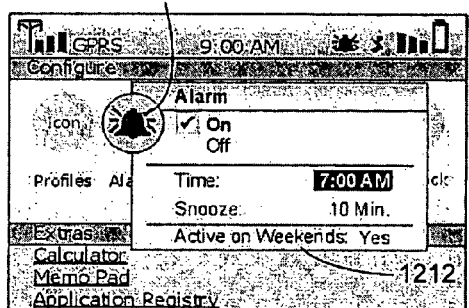
Figure 12D:
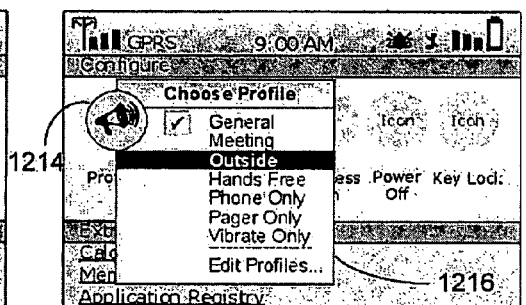

In the present embodiment, the dynamic bars 1004, 1008, 1012, 1016 and 1020 and expansion pop-ups 1006, 1010, 1014, 1018 and 1022 are associated with various applications and services and/or device functions in accordance with a contextual view of how the mobile station may be used by a user. For example, the label portions 1002, 1007, 1011, 1015 and 1019 denote activities such as "communicate", "plan", "entertain" "configure" and "extra". Communicate bar 1004 and expansion pop-up 1006 is similar to the dynamic bar 304 and associated pop-up 602 of earlier embodiments. With reference to FIG. 11B, plan bar 1008 and expansion pop-up 1010 are associated with calendar and task functions 1102 previewing items (e.g. 1006) for the current day 1004 and additional upcoming days 1008 and 1110. A user may navigate the expansion pop-up and select an item or day to invoke the associated application's interface, preferably jumping to the item within the application. As discussed with reference to FIG. 9, a search or filter interface may be incorporated into a dynamic bar (e.g. in association with the label portion or in another manner) to define a filter with which to determine preview information to be displayed.

Entertain bar 1012 and expansion pop-up 1014 is associated with applications for gaming, or presenting or working with media such as a browser, audio application or camera etc. Window 1014 may include links to web pages (e.g. 1112). Entertain bar 1012 may be associated with events, similar to communicate bar 1004, which events may include the availability of new items to download 1114. A count 1113 of same may be displayed in entertain bar 1012 as well. More than one different event type may be monitored and counted as per communicate bar 1004.

Expansion pop-up 1018 of configure bar illustrates a further optional user interface arrangement whereby associated functions are invoked via an icon based interface comprising a plurality of respective icons 1116 (FIG. 11C) and optional labels 1118. Expansion pop-up 1022 for extras bar 1020 comprises a list of links to respective miscellaneous applications or functions provided by device 202.

FIGS. 12A to 12D further illustrate features of expansion pop-up 1018 for configure bar 1016. A user may navigate expansion pop-up 1018 moving among the icons 1116 (e.g. 1202, 1206, 1210 and 1214). Selecting an icon invokes a dialog (e.g. 1204, 1208, 1212 and 1216) to configure options associated with the function represented by the particular icon. For example, icon 1202 relates to wireless networking functions, particularly, turning communication subsystem 211 on or off. Dialog 1204 may be opened (e.g. by moving the focus to the icon 1202 and clicking an enter key or pointing device, etc.) Options may then be reviewed and/or changed and saved. Dialog 1204 may be positioned over a portion of the screen 300 below the associated bar. Preferably a dialog is displayed in association with its respective icon, such as, with the icon visible at a margin of the dialog. Once an option is defined and its value saved, the associated icon may be changed (in whole or in part) to reflect the value of the option. For example, if the wireless communication system is set to off, icon 1202 may change to include an X through the icon or the icon changed to another image completely such as an airplane image. As shown in dialog 1216 (Edit profiles . . . ), links to additional dialogs or other interfaces/function activations may be included.

Figure 13A:
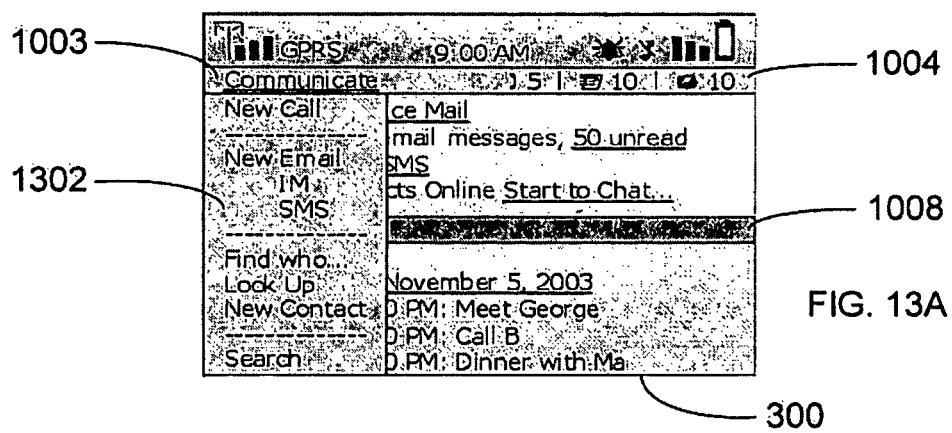
FIGS. 13A to 13C are respective illustrations of FIGS. 11A to 11C. following user action in accordance with an embodiment of the invention.
Figure 13B:
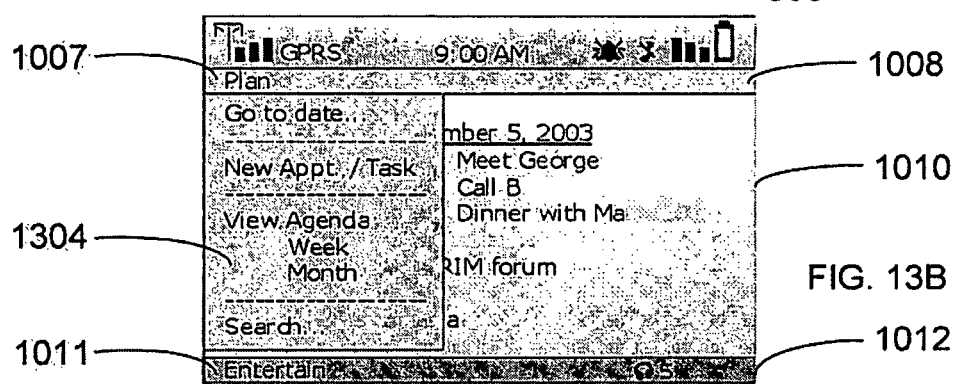
Figure 13C:
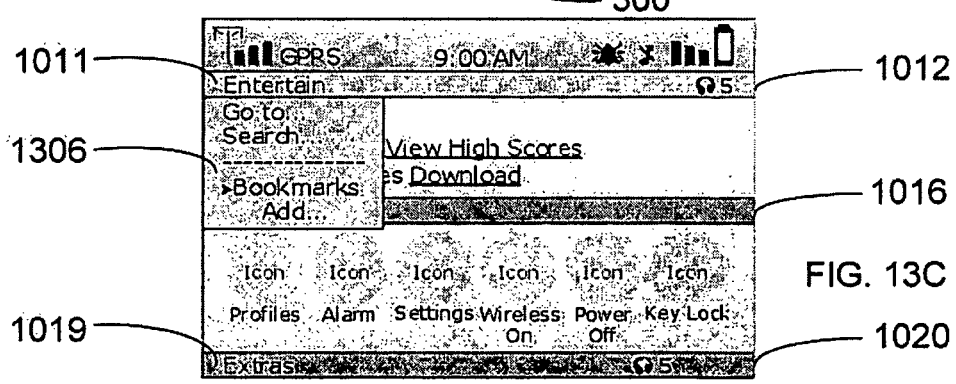

FIGS. 13A, 13B and 13C show examples 1302, 1304 and 1306 of an additional dynamic bar interface expansion element for respective dynamic bars 1004, 1008 and 1012. Each expansion element 1302, 1304 and 1306 is a drop down list comprising particular functions or features of the application(s) associated with the respective dynamic bar which may be invoked from the dynamic bar interface as well as dynamic bar features (e.g. search) or other configurable options (e.g. view agenda, week, month of list 1304) for configuring the dynamic bar or its associated expansion pop-up (e.g. the view of 1010). The expansion element may be invoked by moving a focus to the label portion (e.g. 1003, 1007 or 1011) and hovering for short period of a few seconds or by other well known manners. The expansion element may be closed by click an escape or other cancel key. Though a drop down list is shown, the expansion element may take other forms such as a pop-up. Preferably the element overlays only a portion of the screen 300, leaving the associated dynamic bar and a portion of its expansion pop-up viewable.

FIGS. 14 and 15A to 15C illustrate yet another embodiment of the user interface main screen. The present embodiment is similar to the embodiment of FIG. 10. However the dynamic bars are functionally oriented rather than contextually. Screen 300 of FIG. 14 includes a calendar bar 1402, messages bar 1404, browser bar 1406, configure bar 1408 and extras bar 1410 with respective labels 1403, 1405, 1407, 1409 and 1411. Configure bar 1408 is associated with expansion pop-up 1412 including a list of links (as distinguished from the icons 1116 of FIG. 11C) to invoke interfaces for configuring mobile station 202. FIGS. 15A, 15B and 15C illustrate views of the main screen 300 of FIG. 14 as would appear on a display device 222 as a user navigated the dynamic bars as per similar views in FIGS. 11A to 11D.

Note that while not shown, the expansion pop-ups could be selectively individually closed and the plurality of dynamic bars rendered in a list of bars. Like FIG. 3, an application portion of screen 300 may be present to render application icons. Alternative embodiments of the dynamic bar interface, such as the embodiments of FIG. 10 and FIG. 14 may be available for selection by a user of mobile station 202. Alternatively, a mobile station may be configured to store only one embodiment. The dynamic bars may be configurable or shown in different order. Particular applications and functions may be selected by a user to be associated to a particular dynamic bar.

Figure 16:
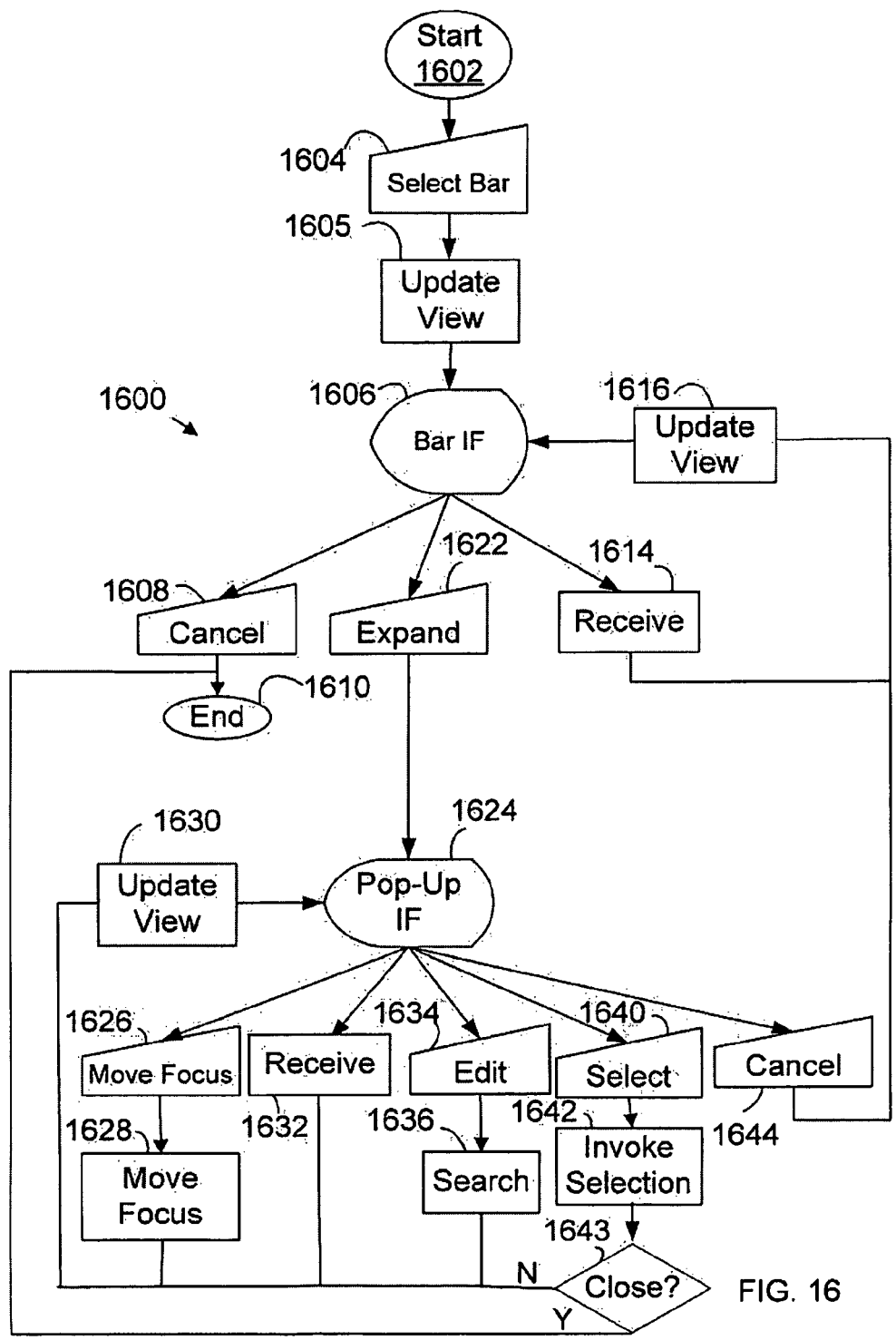
FIGS. 16 and 17 are flowcharts for operations of a user interface in accordance with embodiments of the invention.
Figure 17:
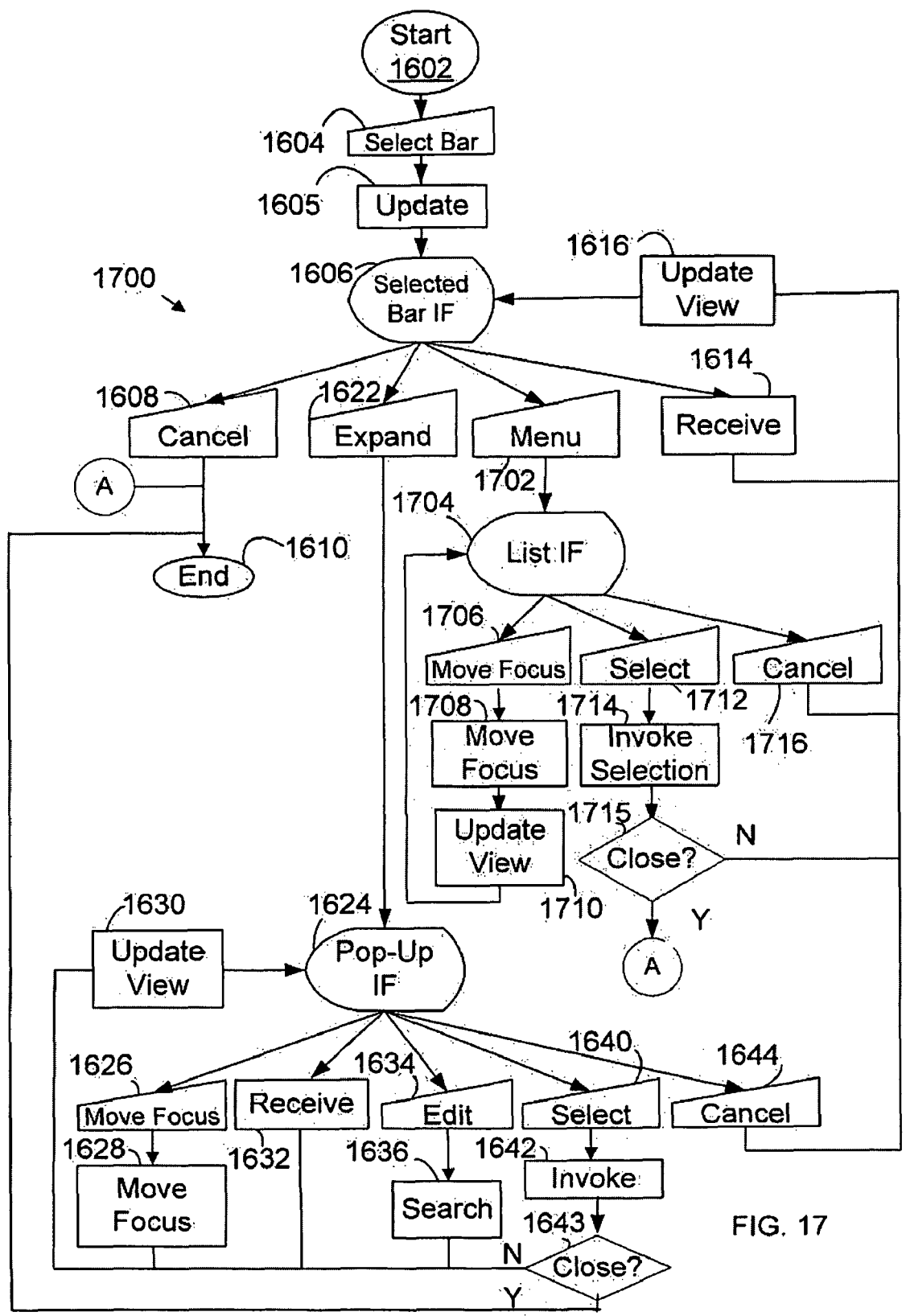

FIGS. 16 and 17 illustrate operations of a dynamic bar user interface in accordance with embodiments of the invention. With reference to FIGS. 3-9 and 16, operations 1600 commence at start 1602, typically following power-up of mobile station 202 and a rendering of a default or initial view of main screen 300. A user may select the dynamic bar (e.g. using a thumb wheel device or other pointer to move a focus about the screen 300) at step 1604. The view of main screen 300 may require updating and redisplay (steps 1605 and 1606) for example to indicate the change to the focus. If a user cancels the selection (step 1608) operations may close (as necessary) at end steps 1610. A new message or other event occurrence, as represented by a count displayed on the dynamic bar, may be received (step 1614) and the view updated and output (steps 1616 and 1606).

The dynamic bar interface may be extended to view an associated expansion pop-up (e.g. FIGS. 4, 6 and 8). At steps 1622-1624, the pop-up interface is invoked in response to user input and the pop-up IF view output. Thereafter, the user may take action such as my moving the thumb wheel or pressing an arrow key on the device to move the focus about the pop-up (step 1626) and in response, the focus is logically moved (step 1628) and the appropriate view determined (step 1630) and output (step 1624). The focus may move to the dynamic bar itself. New events, etc. may be received (step 1632) as described above and the appropriate view (count) determined and output (steps 1630, 1624).

A user may wish to filter the events or other items previewed via the dynamic bar. An editing sequence may commence to select a date (step 1634) and a search or filtering is performed (step 1636). The view is updated and displayed accordingly (steps 1630 and 1624).

An item in the pop-up may be selected, such as a new message (step 1640) and the selection invoked (step 1642) such as by invoking the user interface to the message application. Thereafter operations 1600 may closer and end at steps 1610 and 1612 following decision step 1643. Alternatively, depending on the selection invoked, for example, operations may continue via steps 1630 and 1624 to update the view and output same.

Window IF display (e.g. step 1624) may be closed such as by a cancel input (step 1644). In response, the view is updated and output (steps 1616 and 1606) and operations continue from the dynamic bar interface.

Operations for the embodiments of user interface of FIGS. 10-15 are quite similar to those described. With reference to FIG. 17, operations 1700 are similar but include steps 1702-1716 for invoking the expansion element (i.e. menu list), and, variously, navigating by moving the focus (steps 1706, 1708, 1710, and 1704 as similarly described with reference to 1626, 1628, 1630 and 1624), selecting and invoking an item from the list (steps 1712 and 1714) and canceling the display of the list (1716, 1616 and 1660). Following the invocation of a selection from the menu list (step 1714) operations may close at end step 1610 in response to decision step 1715. Some selected invocations may continue operations via update view step 1616 and output step 1606

Persons of ordinary skill in the art will appreciate that their may be differences in implementing certain steps of the operations described depending on the configuration of the specific dynamic bar and its associated pop-up interface. For example, a dynamic bar not representing a count of associated events will not require steps 1614 et seq. or 1632 et seq. Moving the focus and updating the view within expansion pop-up 1014 may be different than similar operations about pop-up 1018.

Though described with reference to a mobile station device, persons of ordinary skill in the art will appreciate that the user interface and methods herein described may be usefully incorporated into other computing devices which may not be mobile such as personal computers, workstations, telephone handsets and the like.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method for controlling an apparatus comprising a display, the method comprising:
    displaying a dynamic bar on the display;
    displaying dynamic preview information in the dynamic bar, the dynamic preview information being determined from information managed by a software application, the dynamic preview information being updated to reflect a change to the information managed by the software application;
    expanding the dynamic bar to display an expanded dynamic bar in response to a first input from an input device, displaying the expanded dynamic bar comprising:
        displaying additional dynamic preview information determined from the information managed by the software application, the additional dynamic preview information being different from the dynamic preview information displayed in the dynamic bar, and the additional dynamic preview information being updated to reflect the same or different change to the information managed by the software application;
        displaying a selectable link embedded in the additional dynamic preview information to invoke the software application; and
    activating the software application in response to a second input invoking the link.

2. The method of claim 1, further comprising displaying a status portion on the display.

3. The method of claim 2, wherein displaying the status portion comprises displaying signal strength.

4. The method of claim 1, wherein the apparatus comprises a cellular telephone.

5. The method of claim 1, further comprising, following activation of the software application, displaying a user interface for the software application.

6. The method of claim 1, further comprising displaying an application portion on the display, the application portion comprising at least one icon.

7. The method of claim 6, wherein, in response to a user input invoking the icon, the software application is activated.

8. The method of claim 1, wherein the software application is an email application, and wherein the dynamic preview information comprises a preview of a content of an email.

9. The method of claim 1, wherein the software application is a telephone application, and wherein the dynamic preview information comprises an identity of a calling party.

10. The method of claim 1, wherein the software application is a communications application, wherein the dynamic preview information is determined from information about one or more communications managed by the communications application, and wherein the additional dynamic preview information is also determined from the information about the one or more communications managed by the communications application.

11. The method of claim 1, wherein the dynamic bar further comprises an icon representing the software application, and the dynamic preview information is displayed in association with the icon.

12. The method of claim 1, wherein the expanded dynamic bar further comprises an icon representing the software application, and the additional dynamic preview information is displayed in association with the icon.

13. The method of claim 12, wherein the second input comprises selecting the icon.

* * * * *